May 23, 1939. R. J. BUSH 2,159,778
INERTIA OPERATED CONTROL DEVICE
Filed June 2, 1937

INVENTOR
RANKIN J. BUSH
BY Wm. M. Cady
ATTORNEY

Patented May 23, 1939

2,159,778

UNITED STATES PATENT OFFICE 2,159,778

INERTIA OPERATED CONTROL DEVICE

Rankin J. Bush, Jeannette, Pa., assignor to The Westinghouse Air Brake Company, Wilmerding, Pa., a corporation of Pennsylvania Application June 2, 1937, Serial No. 145,984

17 Claims. (Cl. 303—21)

This invention relates to inertia operated control devices, and particularly to inertia operated control devices adapted to function in the control of vehicle brakes.

As is well known, the coefficient of friction between a brake shoe and its associated wheel rim or brake drum increases as the rotative speed of a wheel decreases and that accordingly it is necessary to reduce the braking force urging the brake shoes into contact with the rim or drum, as the vehicle reduces in speed, in order to maintain a substantially constant rate of retardation. Furthermore, it is well known that if the braking force pressing the brake shoes to the brake drum is sufficient, either initially or as the speed of the vehicle reduces, to exceed the coefficient of the adhesion between the vehicle wheel and the road surface or rail along which the wheel rolls, the wheel will slip, that is, reduce rapidly in speed from a speed corresponding to vehicle speed to a locked state. If the braking force is not rapidly reduced when a wheel begins to slip so as to cause it to cease slipping and return to a speed corresponding to vehicle speed, the wheel will slide, that is, it will be dragged along the road surface or rail in a locked-wheel state.

In my prior Patent No. 2,068,370 I have disclosed a device comprising two rotatable bodies adapted to rotate together and rotatably shiftable, relative to each other, when one of the rotatable bodies accelerates or decelerates, the relative rotary movement between the two bodies being effective to cause operation of mechanism for controlling the degree of braking force to effect a substantially constant rate of retardation. The device disclosed in my prior patent was adapted, also, to function as an anti-wheel-sliding device, that is, to cause a rapid reduction in the braking force, when a wheel slips, to prevent its attaining or remaining more than momentarily in a locked state.

It is an object of my present invention to provide a device for a use analogous to that of the device disclosed in my prior patent but constructed and operating in a different manner.

Another object of my present invention is to provide a device having certain improved features as compared to the device disclosed in my prior patent.

Figure 1:
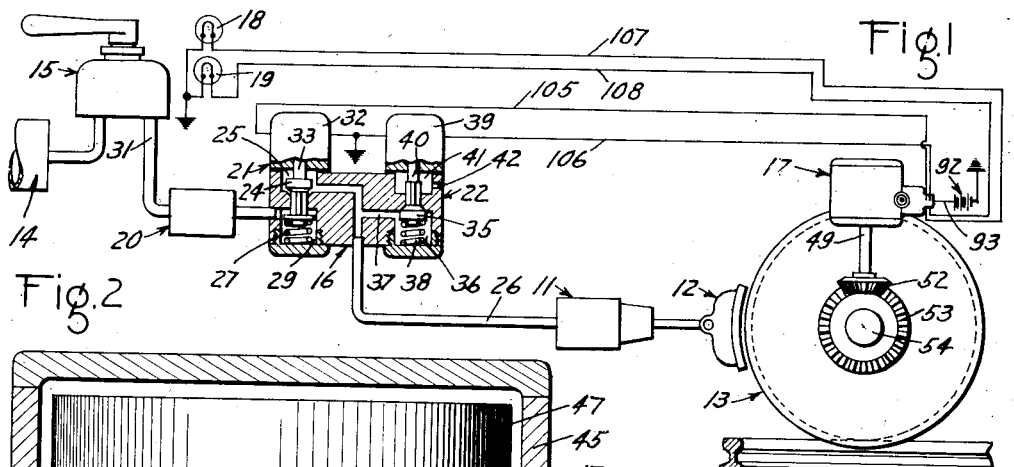
Figure 2:
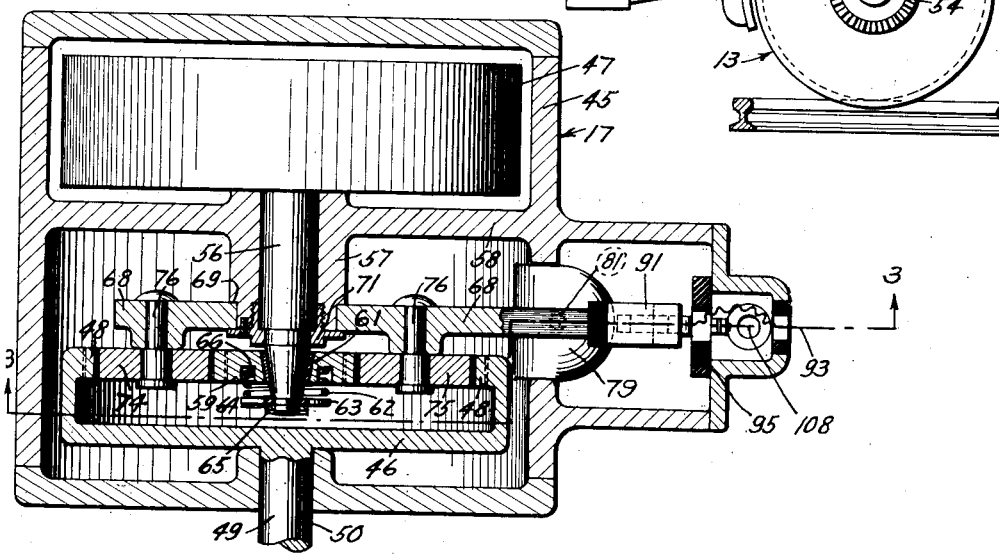
Figure 3:
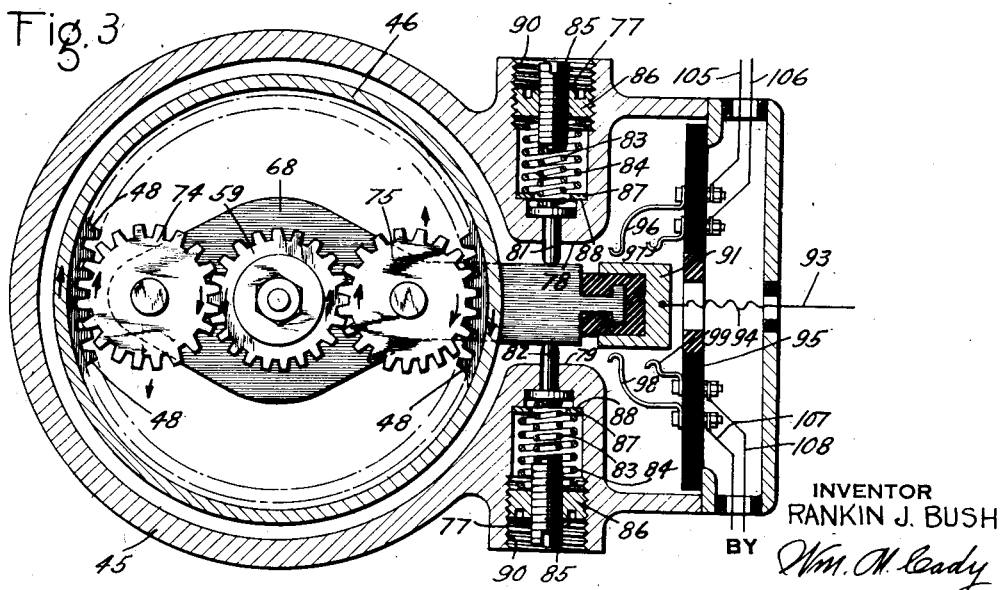

The above objects, and other objects which will be made apparent hereinafter, are attained by means of an illustrative embodiment, subsequently to be described and shown in the accompanying drawing, wherein, Fig. 1 is a simplified diagrammatic view, illustrating an application of my improved inertia operated control device, Fig. 2 is an enlarged sectional view showing details of construction of my improved inertia operated control device, and Fig. 3 is a sectional view taken on the line 3—3 of Fig. 2, showing in further detail the construction of my improved inertia operated device.

Referring to the drawing, Fig. 1, the essential elements of a fluid pressure brake system are shown, which may comprise a brake cylinder 11, a brake shoe 12 arranged to be pressed into braking engagement with the rim of a vehicle wheel 13 upon the supply of fluid under pressure to the brake cylinder 11, a reservoir 14, hereinafter referred to as the main reservoir, from which fluid under pressure is supplied to the brake cylinder under the control of a suitable brake valve device 15, and a volume reservoir 20 interposed in the supply communication to the brake cylinder.

The equipment further includes a magnet valve mechanism 16 for controlling the pressure in the brake cylinder 11 independently of the brake valve device 15 and, according to my invention, an inertia operated control device 17, hereinafter referred to as the inertia device, for controlling the operation of the magnet valve mechanism 16 and the operation of two signal lamps 18 and 19.

For simplicity, brake valve device 15 will be assumed to be of the rotary type having a rotary valve, not shown, which is operated by an operating handle into the various control positions, namely a brake release position, a brake application position, and a lap position. In the brake release position thereof the rotary valve of the brake valve device 15 laps or closes off the supply of fluid under pressure from the reservoir 14 and establishes communication through which a pipe 31 leading to the magnet valve mechanism 16 is connected to atmosphere. In the application position thereof, the rotary valve of the brake valve device 15 establishes communication through which fluid under pressure is supplied from the main reservoir 14 to the pipe 31. In the lap position thereof the rotary valve of the brake valve device 15 laps or closes off the supply of fluid under pressure from the main reservoir 14 and also closes the connection of the pipe 31 to atmosphere.

The volume reservoir 20 is connected in the pipe 31 between the brake valve device 15 and the magnet valve mechanism 16 for the purpose of adding volume to the pipe 31.

The magnet valve mechanism 16 may comprise a casing having embodied therein, a cut-off magnet valve device 21 and a release magnet valve device 22. The cut-off magnet valve device 21 comprises a valve 24, hereinafter referred to as the cut-off valve, which is contained in a chamber 25 connected to the pressure chamber of the brake cylinder 11 through a passage and pipe 26, and an electromagnet 32 for operating the valve. The valve 24 is normally unseated from an associated valve seat by a coil spring 27 acting on the end of the fluted stem of the valve and while so unseated establishes communication between the chamber 25 and a chamber 29 to which the pipe 31 leading from the brake valve device 15 is connected. The electromagnet 32 is effective, when energized, to actuate a plunger 33 to shift the valve 24 against the force of the spring 27 into seated engagement on an associated valve seat to close communication between the chamber 29 and the chamber 25.

The release magnet valve device 22 comprises a valve 35, hereinafter called the release valve, which is contained in a chamber 36 that is connected to the passage and pipe 26 through a branch passage 37, and an electromagnet 39 for operating the valve. The release valve 35 is normally urged to seated engagement on an associated valve seat by a coil spring 38. When energized, the electromagnet 39 actuates a plunger 40 to shift the release valve 35 to unseated position against the force of spring 38. When the release valve 35 is unseated it establishes communication from the chamber 36 and the connected brake cylinder 11 to a chamber 41 which is constantly open to atmosphere through a port 42 of a selected flow capacity.

Referring now to Figs. 2 and 3, the inertia device 17 comprises a casing 45, suitably sectionalized for assembly and disassembly, containing therein a rotary gear wheel 46 and a rotary inertia element in the form of a fly-wheel 47. The gear wheel 46 has a circular flange on which are formed internal gear teeth 48 and is attached to or formed integral with a shaft or rod 49 which projects exteriorly of the casing through an opening 50 in the lower wall of the casing, the shaft 49 being journaled in the opening as by anti-friction bearings, not shown. The shaft 49 is rotated according to the rotation of the vehicle wheel 13, in any suitable manner, as by meshed bevel gears 52 and 53 fixed to the shaft 49 and the axle 54 of the vehicle wheel 13, respectively.

The inertia element or fly-wheel 47 is fixed on or formed integral with a shaft 56 which is supported for rotation in a journal 57 provided with suitable anti-friction bearings, not shown, the journal being formed in or attached to an intermediate wall 58 of the casing 45. Carried on the end of the shaft 56 is a gear wheel 59 which is normally held in fixed relation to the shaft 56, as by a releasable clutch arrangement presently to be described. The end portion of the shaft 56 tapers toward the end of the shaft and the gear wheel 59 has a central opening therein conforming to the taper on the shaft in which is fixed a liner 61 of suitable friction material. A coil spring 62 is interposed between the gear wheel 59 and a collar 63, fixed to the end of the shaft 56 as by a nut 64 and lock nut 65, and yieldingly urges the gear wheel 59 into frictional clutching engagement with the shaft 56. An annular recess 66 in the face of the gear wheel 59 receives one end of the spring 62 and serves to assist in positioning the spring. The purpose of the clutch arrangement between the gear wheel 59 and the shaft 56 will be made apparent hereinafter.

A lever 68, hereinafter referred to as the switch arm, is pivoted for rotation on the journal 57 in substantially perpendicular relation to the shaft 56, suitable anti-friction bearings, not shown, being provided. The switch arm 68 is fitted axially over the reduced end of the journal 57 and is held against axial movement between a shoulder 69 on the journal and the flange on a threaded ring 71 screwed into the end of the journal 57, the shaft 56 extending through the central opening in the ring 71.

Two gear wheels 74 and 75, are rotatably mounted, as by anti-friction bearings not shown, on two pins 76 fixed to the switch arm at opposite sides respectively of the shaft 56. The arrangement and disposition of the switch arm 68 and the gear wheels 74 and 75 is such that the gear wheels 74 and 75 mesh with the gear wheel 59, at diametrically opposite points, and move in epicycloidal relation thereto.

The shaft 49 and the shaft 56 are arranged in coaxial relation so that the internal gear teeth 48 on the gear wheel 46 mesh at diametrically opposite points thereon with the gear wheels 74 and 75, respectively. It will thus be seen that with the switch arm 68 held in a fixed position, rotation of the shaft 49 and gear wheel 46 will cause corresponding rotation of the fly-wheel 47.

The switch arm 68 is held in a normal centered position, between two limit stops 78 and 79 formed on the casing, by spring biased stops 81 and 82 which engage opposite sides of one end of the switch arm. Each of the stops 81 and 82 has two concentrically disposed coil springs 83 and 84 associated therewith for resisting rotary displacement of the switch arm 68 out of its normal centered position. Each of the stops 81 and 82 is provided with a flange at one end thereof which is guided in a reduced portion of a corresponding bore 90 in the casing 45. The inner spring 83 is interposed between the flange of the stop and the inner end of a screw 85, which is screwed in a threaded central opening of another screw 86 that is, in turn, screwed in the outer threaded portion of the bore 90, and yieldingly urges the stop inwardly to an inner position determined by the engagement of the flange with the casing. The outer spring 84 is interposed in the bore 90 between the screw 86 and a collar 87 guided in the bore 90 and yieldingly urges the collar 87 inwardly into engagement with a shoulder 88 formed between the reduced inner portion of the bore 90 and the outer portion thereof. A lock-nut 77 screwed over the outer end of the screw 85 may be provided to prevent undesired loosening or variation in the setting of screw 85.

It should now be apparent that when the switch arm 68 is rotarily shifted in either a clockwise or a counterclockwise direction, as viewed in Fig. 3, from its centered position, the movement of the switch arm is resisted at first only by the spring 83 associated with either of the stops 81 or 82, and that when the flange on the stop is shifted sufficiently outwardly of the bore 90 to engage the collar 87, further rotary movement of the switch arm is resisted by the combined force of the spring 83 and the spring 84 associated with the stop 81 or the stop 82.

The screws 85 and 86 are adjustable to tension the springs 83 and 84 respectively to any desired tension. Furthermore, the spring 84 is so tensioned that the torque force urging the switch arm 68 out of its centered position must increase a certain uniform amount, after the flange of the stop 81 or 82 engages the collar 87, before further rotary displacement of the switch arm from its centered position is permitted. The purpose of this arrangement will be made apparent hereinafter.

The limit stops 78 and 79 on casing 45 are adapted to be engaged by the end of the switch arm 68 when the arm is shifted in a counterclockwise and a clockwise direction, respectively, as viewed in Fig. 3 and they are so positioned that the switch arm 68 does not engage them until after compressing the outer spring 84 associated with the stops 81 and 82, respectively. Carried in insulated relation on the end of the switch arm 68 is a contact member 91 that is constantly connected to one terminal, referred to hereafter as the positive terminal, of a source of electrical energy such as a battery 92 (see Fig. 1) by a wire 93 including a flexible portion 94.

Mounted, as on an insulating member 95 suitably attached to the casing 45, are a pair of spring-tensioned contact fingers 96 and 97 disposed on one side of the contact member 91 and a pair of similar spring-tensioned contact fingers 98 and 99 disposed on the opposite side of the contact member 91. The contact fingers 96 and 97 are so displaced that when the switch arm 68 is rotarily shifted in a counterclockwise direction out of its centered position the contact member 91 first engages only the contact finger 96 and then both the contact fingers 96 and 97. Furthermore, the arrangement of the springs 83 and 84 associated with the stop 81 is such that when the torque force urging the switch arm 68 in a counterclockwise direction is sufficient to overcome only the spring 83, the contact member 91 engages only the contact finger 96, the contact member 97 not being engaged by the contact member 91 until the torque force on the switch arm 68 is sufficient to overcome both the springs 83 and 84.

In a similar manner, the contact fingers 98 and 99 are arranged to be engaged in succession as the switch arm 68 is rotarily displaced from its normal centered position in a clockwise direction as viewed in Fig. 3. Also, the arrangement and adjustment of the springs 83 and 84 associated with the stop 82 is such that when the torque force urging the switch arm 68 in a clockwise direction is sufficient to overcome only the spring 83, the contact member 91 on the switch arm engages only the contact finger 98, the contact finger 99 not being engaged by the contact member 91 until the torque force exerted on the switch arm 68 is sufficient to overcome the resistance of both of the springs 83 and 84.

The contact finger 96 is connected, as by a wire 105, to one terminal of the electromagnet 32 of the cut-off magnet valve device 21 and the contact finger 97 is connected, as by a wire 106, to one terminal of the electromagnet 39 of the release magnet valve device 22. The remaining terminals of each of the electromagnets 32 and 39 are connected to the negative terminal of the battery 92 either through a ground connection in the manner shown, or by a return wire, not shown.

In a similar manner, the contact finger 98 is connected, as by a wire 107, to one terminal of the signal lamp 18 and the contact finger 99 is connected, as by a wire 108, to one terminal of the signal lamp 19, the remaining terminals of both signal lamps being connected to the negative terminal of the battery as through a ground connection in the manner shown.

*Operation*

Assuming that the car or train is traveling along the road in a forward direction with the reservoir 14 charged to a normal pressure, as from a fluid compressor not shown, the operator may effect an application of the brakes by shifting the operating handle of the brake valve device 15 from release position to application position to cause the supply of fluid under pressure from the reservoir 14 to the brake cylinder by way of the pipe 31, chamber 29 of the magnet valve mechanism 16, past the unseated cut-off valve 24, chamber 25, and passage and pipe 26. As will be made apparent hereinafter, the electromagnets 32 and 39 of the cut-off magnet valve device 21 and release magnet valve device 22, respectively, are deenergized under the conditions assumed so that the cut-off valve 24 and the release valve 35 are respectively unseated and seated as shown. When the desired degree of brake application is secured, the operator shifts the handle of the brake valve device 15 to lap position to maintain the pressure established in the brake cylinder.

For convenience, let it be assumed that, for a forward direction of travel of the car or train, the shaft 49 and the connected gear wheel 46 rotate in a clockwise direction as indicated by the arrows in Fig. 3. The epicycloidal idler gears 74 and 75 correspondingly rotate on pins 76 in a clockwise direction, as indicated by the arrows, thereby causing the gear wheel 59 and fly-wheel 47 to rotate in a counterclockwise direction as indicated by the arrows on the gear 59. Thus, while the vehicle travels at a substantially constant speed the fly-wheel 47 and the gear wheel 46 rotate at the same speed although the fly-wheel rotates in a counterclockwise direction while the gear wheel 46 rotates in a clockwise direction.

Upon the retardation of the vehicle wheel 13 and the corresponding retardation of the gear wheel 46, the fly-wheel 47 tends to overspeed or rotate faster than the gear wheel 46. It will be apparent, therefore, that the inertia force of the fly-wheel 47 is effective through the gear wheel 59 and epicycloidal gears 74 and 75 to exert a torque on the switch arm 68 tending to rotate it in a counterclockwise direction, as indicated by the arrows, and that the degree of the torque force will be in proportion to the rate of retardation of the gear wheel 46 and accordingly of the vehicle wheel 13.

As long as the torque force tending to rotate the switch arm 68 in a counterclockwise direction is insufficient to overcome the resistance of the spring 83 acting on the stop 81, the contact member 91 on the switch arm 68 will remain substantially in its normal centered position. However, when the rate of retardation of the vehicle wheel 13, and accordingly of the gear wheel 46, reaches a sufficient rate, such as a rate corresponding to a rate of retardation of the vehicle of three miles per hour per second, the torque force exerted to rotate the switch arm 68 in a counterclockwise direction overcomes the spring 83 and the contact member 91 is then shifted into engagement with the contact finger 96. A circuit is thereupon completed for energizing the electromagnet 32 of the cut-off magnet valve device 21, this circuit extending from the positive terminal of the battery 92, through wire 93, contact member 91 of the switch arm 68, contact finger 96, wire 105, electromagnet 32, and through ground to the negative terminal of the battery 92. Upon energization of the electromagnet 32, the cut-off valve 24 is actuated to seated position to cut off communication through which fluid under pressure may be supplied from the main reservoir 14 and volume reservoir 20 to the brake cylinder 11.

Now, as the rate of retardation of the vehicle wheel 13 further increases, due to an increase in the retarding force exerted thereon as a result of the usual increase in the coefficient of friction between the brake shoe and the rim of the vehicle wheel 13 with decreasing speed, the torque force urging the switch arm 68 in a counterclockwise direction correspondingly increases. However, due to the fact that the flange of the stop 81 engages the collar 87, the rotary shifting of the switch arm 68 in a counterclockwise direction is now resisted by the combined force of the springs 83 and 84 and, consequently, until the rate of retardation of the vehicle wheel 13 increases sufficiently, as to a rate corresponding to a rate of retardation of the vehicle of four miles per hour per second, the torque force is insufficient to overcome the springs 83 and 84.

However, when the vehicle is retarded at the assumed rate of four miles per hour per second and the torque force tending to rotate switch arm 68 in a counterclockwise direction accordingly increases sufficiently to overcome both the springs 83 and 84, the contact member 91 on the switch arm 68 is shifted further in a counterclockwise direction to also engage the contact finger 97 thereby closing the circuit for energizing the electromagnet 39 of the release magnet valve device 22 while at the same time maintaining closed the circuit for energizing the cut-off magnet valve device 21. The circuit, thus established, for energizing the electromagnet 39 extends from the positive terminal of the battery 92, through the wire 93 and contact member 91, contact finger 97, wire 106, electromagnet 39, and through ground to the negative terminal of battery 92.

Upon energization of the electromagnet 39 of the release magnet valve device 22 the release valve 35 is unseated, and fluid under pressure is thus released from the brake cylinder 11 to atmosphere through the pipe and passage 26, branch pasage 37, chamber 36, past the unseated valve 35, and through chamber 41 and exhaust port 42. The cross-sectional area of the exhaust port 42 is so selected as to prevent overcasting, that is, a too rapid and too great reduction in the brake cylinder pressure. Accordingly, the braking force pressing the brake shoe 12 to the rim of vehicle wheel 13, and thus the rate of retardation of the wheel, diminishes at such a rate that the torque force exerted to rotate the switch arm 68 in a counterclockwise direction reduces only to a degree insufficient to overcome the combined force of the springs 83 and 84 which accordingly shift the switch arm 68 in a clockwise direction to effect disengagement of the contact member 91 from only the contact finger 97.

Upon the disengagement of the contact member 91 from the contact finger 97, the circuit for energizing the electromagnet 39 of the release valve device 22 is interrupted and the electromagnet 39 is deenergized to effect reseating of the release valve 35. The release valve 35, when seated, cuts off the release communication, previously described, and thus the further release of fluid under pressure from the brake cylinder 11 is stopped. Accordingly, brake cylinder pressure and the retarding force on wheel 13 is maintained to a degree such that the torque on the switch arm 68 continues to overcome spring 83 and thus maintain contact member 91 in engagement with contact finger 96.

As the speed of the car or train further reduces, the retarding force exerted on the vehicle wheel 13 again increases due to the increase in the coefficient of friction between the brake shoe 12 and the rim of the vehicle wheel 13 with decreasing vehicle speed. When the rate of retardation of the vehicle wheel again increases sufficiently that the torque force exerted to rotate the switch arm 68 in a counterclockwise direction is sufficient to overcome the combined resistance of the springs 83 and 84, switch arm 68 is again shifted in a counterclockwise direction to effect reengagement of the contact member 91 with contact finger 97. Thereupon, the electromagnet 39 of the release magnet valve device 22 is again energized and fluid under pressure is again released from the brake cylinder 11 until such time as the rate of retardation of the vehicle wheel reduces sufficiently that the torque force exerted on the switch arm 68 is insufficient to maintain the contact member 91 on the switch arm in engagement with the contact member 97. The electromagnet 39 is then again deenergized and the release magnet valve 35 is reseated to cut off the further release of fluid under pressure from the brake cylinder 11.

It will thus be seen that the inertia device 17 operates to regulate the rate of retardation of the vehicle wheel and, therefore, of the car or train to a substantially constant rate, which rate is determined according to the tension to which the springs 83 and 84 are adjusted by the screws 85 and 86.

When the car or train comes to a complete stop and a torque force ceases to be exerted on the switch arm 68, the switch arm 68 is returned to its normal centered position by the spring 85 acting on the stop 81. The contact member 91 on the switch arm 68 is thus disengaged from the contact finger 96 to cause interruption of the circuit for energizing the electromagnet 32 of the cut-off magnet valve device 21. The electromagnet 32 is accordingly deenergized and the cut-off valve 24 thereupon shifted to unseated position to reestablish communication through which fluid under pressure may be supplied from the volume reservoir 20 through pipe 31 to the passage and pipe 26 leading to the brake cylinder 11. Fluid under pressure is thus again supplied to the brake cylinder 11 to increase the pressure in the brake cylinder.

It will be understood that with the rotary valve of the brake valve device 15 remaining in lap position, the main reservoir 14 is cut off and does not resupply fluid under pressure to the brake cylinder. It will also be understood that the volume reservoir 20 may be of any suitable capacity so that the maximum restored pressure in the brake cylinder 11 is limited according to the pressure of equalization between the volume reservoir 20 and brake cylinder 11.

If the brake cylinder pressure automatically resorted is insufficient to hold the car or train on a grade, the operator may readily operate the brake valve device 15 to increase the brake cylinder pressure sufficiently to hold the car or train against creepage on the grade.

The equipment may be adapted to function as an anti-wheel-sliding mechanism by providing a relatively large exhaust port 42 for the release magnet valve device 22 and by screwing the adjusting screws 85 and 86 inwardly of the bore 90 so as to increase the tension of the springs 83 and 84. The tension of the springs 83 and 84 should be so increased as to prevent the shifting of the switch arm 68 sufficiently in a counterclockwise direction to effect engagement of the contact member 91 with the contact fingers 96 and 97, unless the rate of retardation of the vehicle wheel exceeds a certain high rate which will occur only in the event that the vehicle wheel 13 slips.

The operation of the equipment as an anti-wheel-sliding mechanism is similar to that previously described for operation of the inertia device as a retardation controller. Let it be assumed that the brake valve device 15 has been operated to effect an application of the brakes in the manner previously described, the rotary valve of the brake valve device 15 being shifted to lap position when the desired degree of application is attained, and that due to the application of the brakes so effected, the vehicle wheel 13 begins to slip.

When the vehicle wheel 13 exceeds the certain high rate of retardation while slipping, the torque force exerted on the switch arm 68 is sufficient to overcome the tension of both the springs 83 and 84 associated with the stop 82 and, consequently, the switch arm 68 is shifted in a counterclockwise direction sufficiently to cause the contact member 91 thereon to successively engage the contact fingers 96 and 97. The electromagnet 32 of the cut-off magnet valve device 21 and the electromagnet 39 of the release magnet valve device 22 are thus successively energized and accordingly the communication through which fluid under pressure may be supplied to the brake cylinder is closed and the exhaust communication through which fluid under pressure is released from the brake cylinder is established, as in the manner previously described for operation of the inertia device as a retardation controller.

In the event that the rate of retardation of the vehicle wheel, while slipping, should be sufficiently high to cause the switch arm 68 to so compress the spring 84 that the switch arm strikes the limit stop 78 on the casing 45, the clutch arrangement whereby the gear wheel 59 is fixed to the shaft 56 of the fly-wheel 47 permits the gear wheel 59 to slip rotatively relative to the shaft 56 and thus prevents possible breakage of the switch arm 68 or other stressed parts.

As previously indicated, the size of the exhaust port 42 is made relatively large when the equipment is employed as an anti-wheel-sliding mechanism in comparison to its size when employed for operation of the equipment as a retardation controller. It will thus be seen that by providing an exhaust port 42 of sufficiently large flow capacity, fluid under pressure may be rapidly vented from the brake cylinder 11 substantially immediately upon the initiation of the slipping of the vehicle wheel 13. When the brake cylinder pressure has been reduced sufficiently, the vehicle wheel ceases its deceleration and accelerates back toward a speed corresponding to the vehicle speed.

It will thus be apparent that upon such acceleration of the vehicle wheel 13, the gear wheel 46 of the inertia device 17 tends to overspeed the fly-wheel 47 and, consequently, causes a torque to be exerted on the switch arm 68 tending to rotate it in a clockwise direction. Shifting of the switch arm 58 in a clockwise direction is first resisted by the spring 83 acting on the stop 82 and thereafter by both spring 83 and the spring 84 associated with the stop 82.

Due to the relatively light weight of the vehicle wheel in comparison to the weight of the car or train, it will be apparent that the vehicle wheel 13 will accelerate, following slipping thereof, at a relatively rapid rate so that the torque force exerted on the switch arm 68 is sufficient to overcome the combined resistance of the springs 83 and 84 associated with the stop 82. Thus, due to the shifting of the switch arm 68 in the clockwise direction, the contact member 91 thereon successively engages the contact fingers 98 and 99 to successively complete the energizing circuits for the signal lamps 18 and 19, respectively. The illumination of both the signal lamps 18 and 19 thus serves, in this instance, to indicate to the operator that a vehicle wheel has slipped and that the wheel-slipping condition is being relieved.

If the rate of rotative acceleration of the vehicle wheel, while returning back toward a speed corresponding to the vehicle speed, is sufficient to cause the switch arm 68 to strike the limit stop 79 on the casing 45, then, as in the case of engagement of the switch arm 68 with the limit stop 78, the gear wheel 59 on the shaft 56 of the fly-wheel 47 slips relative to the shaft 56 so that the stress on the switch arm 68 and other parts is limited and breakage of the parts prevented.

As the speed of the vehicle wheel 13 approaches a speed corresponding to vehicle speed and the rate of acceleration thereof correspondingly decreases, the torque force acting to shift the switch arm 68 in a clockwise direction is relieved and under the combined action of the springs 83 and 84 the switch arm 68 is returned toward its normal centered position to effect disengagement of the contact member 91 from the contact fingers 98 and 99. The circuits for energizing the signal lamps 18 and 19 are thereupon interrupted and the signal lamps extinguished.

In view of the fact that the contact finger 91 disengages the contact fingers 96 and 97 when it is shifted in a clockwise direction into engagement with the contact fingers 98 and 99, the electromagnets 32 and 39 of the magnet valve mechanism 16 are both deenergized and, consequently, fluid under pressure is resupplied to the brake cylinder 11 while the vehicle wheel 13 accelerates back toward a speed corresponding to vehicle speed. Unless the brake cylinder pressure restored is sufficient to again cause slipping of the vehicle wheel, the contact member 91 on the switch arm 68 is not shifted out of its normal centered position thereafter sufficiently to re-engage the contact fingers 96 and 97.

With the rotary valve of the brake valve device 15 remaining in lap position, however, the pressure in the brake cylinder can only be restored to the pressure of equalization between the volume reservoir 20 and the brake cylinder 11. In view of the fact that the brake cylinder pressure was reduced substantially to a relatively low value upon slipping of the vehicle wheel, it will be apparent that the maximum pressure automatically restored in the brake cylinder will be limited to a pressure greatly reduced from the original brake cylinder pressure corresponding to the original pressure established in the volume reservoir 20. The wheel 13 is thus not likely to again slip during the remainder of the application of the brakes, unless the operator operates the brake valve device 12 to increase brake cylinder pressure.

Should the vehicle wheel 13 again slip following automatic restoration of the brake cylinder pressure, the above operation is repeated, the restored brake cylinder pressure in each instance becoming lower and lower.

It will thus be apparent that by causing the release magnet valve device 22 to respond rapidly enough, upon the slipping of the vehicle wheel 13, and by providing a sufficiently large exhaust port 42 for the release valve device 22, the pressure in the brake cylinder 11 will be reduced rapidly enough and to a sufficient degree, to cause the vehicle wheel 13 to accelerate back toward a speed corresponding to vehicle speed during the slipping period or interval without actually attaining a locked-wheel state, thereby preventing sliding of the wheel. However, even though the vehicle wheel 13 should momentarily attain a locked-wheel state, it remains in the locked-wheel state only momentarily, so that sliding of the vehicle wheel is only momentary in any case.

The inertia device 17 comprising my invention has further utility in enabling the control of the rate of acceleration of a car or train under power. Obviously, by suitably adjusting the tension of the springs 83 and 84 associated with the stop 82, the signal lamps 18 and 19 will be illuminated when the vehicle is accelerated under power at certain selected rates, such as three miles per hour per second and four miles per hour per second, respectively. Upon observing the illumination of the signal lamp 18 at a rate of acceleration of three miles per hour per second, the operator is warned that the vehicle is rapidly approaching the selected limit of acceleration. Upon observing the subsequent illumination of the signal lamp 19 the operator is apprised of the fact that the selected maximum rate of acceleration of four miles per hour per second has been attained and he may thereafter take steps to guard against further increase in the rate of acceleration of the vehicle under power.

*Adaptation of equipment to a train or car*

For simplicity, I have illustrated my invention in connection with a single wheel or wheel-and-axle unit, but it will be apparent that it is readily adaptable in the control of the brakes associated with all the wheels of a train or car. For example, a plurality of brake cylinders for applying the brakes to the respective wheel-and-axle units of the various cars of the trains may be controlled by the brake valve device 15 in the usual manner of the well known automatic fluid pressure brake system now in use on railway trains, the pressure in each brake cylinder being individually controlled by a retardation controller or inertia device corresponding to the inertia controller device 17.

Furthermore, in a car or train adapted to travel in either a forward or backward direction, suitable reversing switches may be provided for connecting the wires 105 and 106 to the electromagnets of magnet valve devices 21 and 22, as shown, or to the signal lamps 18 and 19. In a similar manner, a reversing switch may be provided for connecting the wires 107 and 108 to the signal lamps 18 and 19, as shown, or to the electromagnets of the magnet valve devices 21 and 22, it being understood that if the wires 105 and 106 are connected to the signal lamps 18 and 19, then the wires 107 and 108 will be connected to the electromagnets of magnet valve devices 21 and 22. Thus, the energization and deenergization of the electromagnets of the magnet valve devices 21 and 22 may be controlled according to the deceleration of the vehicle wheels, and the signal lamps 18 and 19 according to the acceleration of the vehicle wheels, regardless of whether the car or train is traveling in a forward or a backward direction.

*Summary*

Summarizing, it will be seen that I have disclosed a fluid pressure brake system, including an inertia operated control device adapted to function as a retardation controller to regulate the rate of retardation of the train to a substantially constant rate, adapted to operate as an anti-wheel-sliding mechanism, and adapted to operate as a device for indicating the rate of acceleration of a car or train under power.

It will be apparent, furthermore, that I have disclosed an inertia device of novel construction which is adapted to function in a plurality of capacities, several of which have been pointed out in the previous description.

It will also be apparent that while I have disclosed a specific construction for the inertia device of my invention, various omissions, additions or modifications may be made therein without departing from the spirit of my invention. It is not my intention, therefore, to limit the scope of my invention except as it is nesessitated by the scope of the prior art.

Having now described my invention, what I claim as new and desire to secure by Letters Patent, is:

1. An inertia device comprising a rotary member, a rotary inertia element, and means for causing the inertia element to be rotated according to the rotation of the said rotary member, said last means including means having a certain normal stationary position as long as the said rotary member and inertia element rotate at the same speed and so arranged as to be moved out of its said normal stationary position only when the said rotary member and inertia element tend to rotate at different speeds.

2. An inertia device comprising a rotary member, a rotary inertia element, and means for causing the inertia element to be rotated according to the rotation of the said rotary member, said last means including means normally stationary in a certain position as long as the said rotary member and the inertia element rotate at the same speed and adapted to be moved rotarily in one direction out of its said certain position when the said inertia element tends to overspeed the said rotary member and rotarily in the opposite direction out of its said certain position when the said rotary member tends to overspeed the said inertia element.

3. An inertia device comprising a rotary member, a rotary inertia element, and means for causing the inertia element to be rotated according to the rotation of the said rotary member, said last means including means having a certain normal stationary position as long as the said rotary member and inertia element rotate at the same speed and so arranged as to be moved out of its said normal stationary position only when the said rotary member and inertia element tend to rotate at different speeds, and yielding means for resisting movement of the movable means out of its stationary normal position.

4. An inertia device comprising a rotary member, a rotary inertia element, and means for causing the inertia element to be rotated according to the rotation of the said rotary member, said last means including means normally stationary in a certain position as long as the said rotary member and the inertia element rotate at the same speed and adapted to be moved rotarily in one direction out of its said certain position when the said inertia element tends to overspeed the said rotary member and rotarily in the opposite direction out of its said certain position when the said rotary member tends to overspeed the said inertia element, and yielding means for resisting movement of the movable means in either direction out of its normal position.

5. An inertia device comprising a rotary member, a rotary inertia element, a pivoted member, a gear wheel rotatably carried on the said pivoted member and so arranged as to cause the inertia element to be rotated according to the rotation of the said rotary member, and yielding means effective to maintain the pivoted member stationary in a certain position as long as the said rotary member and inertia element rotate at the same speed, and adapted to yield to permit pivotal movement of the said pivoted member out of its certain stationary position when the said rotary member and inertia element tend to rotate at different speeds.

6. An inertia device comprising a rotary member, a rotary inertia element, a pivoted member, a gear wheel rotatably carried on the said pivoted member and so arranged as to cause the inertia element to be rotated according to the rotation of the rotary member, and a pair of springs arranged to yieldingly resist pivotal movement of the pivoted member out of a certain normal position thereof which movement occurs when the said rotary member and inertia element tend to rotate at different speeds, only one of said springs being effective to resist movement of the pivoted member for a predetermined degree of displacement of the pivoted member from its certain normal position and both of said springs being effective thereafter to resist further displacement of the pivotal member away from its certain normal position.

7. An inertia device comprising a rotary member, a gear wheel rotatable with said rotary member, a rotary inertia element, a gear wheel rotatable with said inertia element, a pivoted element normally stationary in a certain position, an idler gear wheel rotatably mounted on said pivoted element and arranged to mesh with said two gear wheels and thereby cause rotation of the rotary inertia element corresponding to rotation of the rotary member, said pivoted element being subject to a torque tending to shift it pivotally out of its normal position when the said rotary member and inertia element tend to rotate at different speeds.

8. An inertia device comprising a rotary member, a gear wheel rotatable with said rotary member, a rotary inertia element, a gear wheel rotatable with said inertia element, a pivoted element normally stationary in a certain position, an idler gear wheel rotatably mounted on said pivoted element and arranged to mesh with said two gear wheels and thereby cause rotation of the rotary inertia element corresponding to rotation of the rotary member, said pivoted element being subject to a torque tending to shift it pivotally out of its normal position when the said rotary member and inertia element tend to rotate at different speeds, and means yieldingly opposing pivotal shifting of said pivoted element out of its normal position.

9. An inertia device comprising a rotary member, a gear wheel rotatable with said rotary member, a rotary inertia element, a gear wheel different from the first said gear wheel, a clutch device arranged to releasably connect the said different gear wheel and the inertia element for rotation together, a pivoted element normally stationary in a certain position, an idler gear wheel rotatably mounted on said pivoted element and arranged to mesh with said two gear wheels and thereby cause rotation of the said rotary inertia element corresponding to rotation of the rotary member, said pivoted element being subject to a torque tending to shift it pivotally out of its normal position when the said rotary member and inertia element tend to rotate at different speeds, stationary stop means for engaging said pivotal element and preventing more than a certain uniform degree of displacement of the pivoted element out of its normal position, said clutch device being arranged to permit a release of the connection between the said different gear wheel and the said inertia element when the said pivoted element engages the said stationary stop means.

10. An inertia device comprising a rotary internal gear wheel, a rotary inertia element, a gear wheel rotatable with said inertia element, a pivoted element normally stationary in a certain position, and an idler gear wheel rotatably mounted on said pivoted element and meshing with said internal gear wheel and said gear wheel to cause rotation of the said gear wheel and inertia element according to rotation of the said internal gear wheel, said pivoted element being subject to a torque tending to shift it pivotally out of its normal position when the internal gear wheel and the inertia element tends to rotate at different speeds.

11. An inertia device comprising an internal gear wheel, a rotary inertia element, a gear wheel rotatable with the said inertia element, a pivoted element arranged to be moved pivotally on an axis coaxial to the axis of rotation of the gear wheel rotatable with the said inertia element, an idler gear wheel rotatably mounted on the pivoted element and arranged to mesh with the internal gear wheel and the said gear wheel at diametrically opposite points thereon, and means yieldingly resisting pivotal movement of the pivoted element out of a certain normal position thereof, said idler gear wheel rotating idly to transmit rotation of the said internal gear wheel to effect corresponding rotation of the said rotary inertia element and adapted to move in epicycloidal relation to the said gear wheel to cause pivotal movement of the said pivoted element out of its normal position when the said internal gear wheel and the said inertia element tend to rotate at different speeds.

12. An inertia device comprising a rotary member, a rotary inertia element, a pivoted member, a gear wheel rotatably carried on the said pivoted member and so arranged as to transmit the rotary movement of the said rotary member to cause corresponding rotation of the rotary inertia element, yielding means for maintaining the pivoted member in a certain position as long as the said rotary member and inertia element rotate at the same speed and adapted to yield to permit pivotal movement of the said pivoted member out of the said certain position thereof when the said rotary member and inertia element tend to rotate at different speeds, a contact member carried on said pivoted member, a stationary contact member, said two contact members being arranged to cooperate in the control of an electrical circuit.

13. An inertia device comprising a rotary member, a rotary inertia element, a pivoted member, a gear wheel rotatably carried on the said pivoted member and so arranged as to transmit the rotary movement of the said rotary member to cause corresponding rotation of the said inertia element, yielding means for maintaining the said pivoted member in a certain normal position as long as the said rotary member and inertia element rotate at the same speed and adapted to yield to permit pivotal movement of the said pivoted member out of its certain normal position when the said rotary member and inertia element tend to rotate at different speeds, a contact member carried on the said pivoted member, and a pair of stationary contact members, said stationary contact members being so disposed that the contact member on the pivoted member engages first only one of the contact members and then both of the stationary contact members upon displacement of the pivoted member out of its certain normal position.

14. A vehicle brake system comprising, in combination, a rotary member rotatable according to the rotation of a vehicle wheel, a rotary inertia element, a pivoted member, an idler gear wheel rotatably carried on the pivoted member for transmitting rotation of the said rotary member to cause corresponding rotation of the said inertia element, yielding means for holding said pivoted member stationary normally in a certain position as long as the said rotary member and the inertia element rotate at the same speed, said pivoted member being subject to a torque tending to shift it out of its certain normal position against the opposition of said yielding means when the said rotary member and the inertia element tend to rotate at different speeds, and means controlled by pivotal movement of the pivoted member for controlling the degree of application of the brakes.

16. An inertia device comprising a rotary member, a rotary inertia element, means for causing the inertia element to be rotated according to the rotation of the said rotary member, said last means including means having a certain normal stationary position as long as the said rotary member and inertia element rotate at the same speed and so arranged as to be moved out of its said normal stationary position only when the said rotary member and inertia element tend to rotate at different speeds, and vehicle control means governed by movement of said means out of its certain normal position.

16. An inertia device comprising a rotary member, a rotary inertia element, a gear wheel for effecting a driving connection between the rotary member and the inertia element, a movable member carrying said gear wheel, and resilient means for maintaining said movable member stationary in a certain normal position as long as the rotary member and the inertia element rotate at the same speed and yieldable to permit movement of said movable member out of its normal position when the rotary member and the inertia element tend to rotate at different speeds.

17. A control device comprising a rotary member, a rotary inertia element, a gear wheel for effecting a driving connection between the rotary member and the inertia element, a movable member carrying said gear wheel, resilient means effective to maintain said movable member stationary in a certain normal position as long as the rotary member and the inertia element rotate at the same speed and yieldable to permit movement of said movable member out of its normal position when the rotary member and the inertia element tend to rotate at different speeds, and a control element actuated by movement of said movable member.

RANKIN J. BUSH.